United States Patent

Wiedenmann et al.

(10) Patent No.: US 9,644,775 B2
(45) Date of Patent: May 9, 2017

(54) PIPE CONNECTOR WITH COMPENSATOR

(71) Applicant: KRONES AG, Neutraubling (DE)

(72) Inventors: Willi Wiedenmann, Riesbuerg (DE); Johann Justl, Neutraubling (DE); Martin Sauer, Kaisheim (DE)

(73) Assignee: KRONES AG, Neutraubling (DE)

(*) Notice: Subject to any disclaimer, the term of this patent is extended or adjusted under 35 U.S.C. 154(b) by 927 days.

(21) Appl. No.: 13/848,674

(22) Filed: Mar. 21, 2013

(65) Prior Publication Data

US 2013/0249207 A1    Sep. 26, 2013

(30) Foreign Application Priority Data

Mar. 26, 2012 (DE) .......................... 10 2012 204 800

(51) Int. Cl.
*F16L 51/02* (2006.01)
*F16L 25/01* (2006.01)

(52) U.S. Cl.
CPC .............. *F16L 51/02* (2013.01); *F16L 51/027* (2013.01); *F16L 25/01* (2013.01); *F16L 2201/44* (2013.01)

(58) Field of Classification Search
CPC .......... F16L 51/02; F16L 51/027; F16L 25/01
USPC ........................................................ 285/226
See application file for complete search history.

(56) References Cited

U.S. PATENT DOCUMENTS

| | | | | |
|---|---|---|---|---|
| 1,586,725 A * | 6/1926 | Westinghouse | ..... | F16L 27/0812 285/226 |
| 1,726,483 A * | 8/1929 | Giesler | ................ | F16L 37/002 285/18 |
| 2,014,355 A * | 9/1935 | Hussman | ................ | F16L 55/02 285/226 |
| 2,485,370 A * | 10/1949 | Dreyer | .................. | F16L 51/035 285/368 |
| 2,650,111 A * | 8/1953 | Kaiser | ..................... | F16L 59/14 285/226 |
| 2,713,503 A * | 7/1955 | Ekholm | ................ | F16L 51/027 285/226 |
| 2,732,227 A * | 1/1956 | Kaiser | ..................... | F16L 59/21 285/226 |
| 2,931,669 A * | 4/1960 | McDonald | ............ | F16L 51/026 285/288.1 |
| 3,068,026 A * | 12/1962 | McKamey | ............ | F16L 59/065 285/363 |
| 3,254,907 A * | 6/1966 | Imus | ........................ | F16L 55/02 285/226 |
| 3,844,587 A * | 10/1974 | Fuhrmann | ............... | F16L 23/12 285/368 |

(Continued)

FOREIGN PATENT DOCUMENTS

| | | |
|---|---|---|
| CN | 1085640 A | 4/1994 |
| DE | 886683 C * | 8/1953 ............ F16L 51/027 |

(Continued)

OTHER PUBLICATIONS

Search Report for DE 13158718.0, dated Jun. 2, 2014.

(Continued)

*Primary Examiner* — David E Bochna
(74) *Attorney, Agent, or Firm* — Marshall, Gerstein & Borun LLP (57) ABSTRACT

A pipe connector including a compensator and a centering sleeve that, in the mounted state, extends along the entire length of the compensator.

11 Claims, 6 Drawing Sheets

(56) References Cited

U.S. PATENT DOCUMENTS

| | | | | |
|---|---|---|---|---|
| 4,047,740 | A | * | 9/1977 | Young .................. F16L 51/025 285/226 |
| 4,106,798 | A | * | 8/1978 | Haug .................... F16L 51/025 285/226 |
| 4,144,968 | A | | 3/1979 | Shelton |
| 4,204,707 | A | * | 5/1980 | Lincicome ............. F16L 27/111 285/226 |
| 4,350,372 | A | * | 9/1982 | Logsdon ................ F16L 27/111 285/226 |
| 4,445,332 | A | * | 5/1984 | Thies ...................... F16L 39/02 285/226 |
| 4,611,827 | A | * | 9/1986 | Marti .................... F16L 51/027 285/226 |
| 5,133,578 | A | * | 7/1992 | Whightsil, Sr. ....... E21B 17/085 285/226 |
| 5,797,628 | A | * | 8/1998 | Kuhn .................. F01N 13/1816 285/226 |
| 5,944,363 | A | * | 8/1999 | Cwik .................. F01N 13/1811 285/226 |
| 6,234,542 | B1 | | 5/2001 | Peterson et al. |
| 2011/0126739 | A1 | | 6/2011 | Korpi |
| 2013/0249207 | A1 | * | 9/2013 | Wiedenmann ........ F16L 51/027 285/45 |

FOREIGN PATENT DOCUMENTS

| | | |
|---|---|---|
| DE | 2703064 A1 | 7/1978 |
| DE | 2738231 A1 | 3/1979 |
| DE | 3208516 A1 | 10/1982 |
| DE | 19533627 C1 | 4/1997 |
| DE | 10259213 A1 | 7/2004 |
| DE | 102006022574 A1 | 2/2007 |
| FR | 2660046 A1 | 9/1991 |
| GB | 792476 A | 3/1958 |
| GB | 2094916 A | 9/1982 |

OTHER PUBLICATIONS

Search Report for EP 13158718.0, dated Jun. 2, 2014.
Search Report in DE 10 2012 204 800.6 dated Jan. 8, 2013.
Search Report for Mexican Application No. MX/a/2012/002950, dated Mar. 25, 2015.
Office Action, Notification of the Second Office Action, The State Intellectual Property Office of P.R. China, Application No. 201310099978.3, issue date Mar. 19, 2015.
Notification of First Office Action, The State Intellectual Property Office of P.R. China, Application No. 201310099978.3, date Oct. 28, 2014.
Summons for EP Application No. 13158718.0 dated Feb. 8, 2016.

* cited by examiner

PIPE CONNECTOR WITH COMPENSATOR

FIELD OF THE INVENTION

The present disclosure relates to a pipe connector with a compensator.

BACKGROUND

Pipe connectors with compensators are used in order to compensate for a thermal change, particularly an expansion of pipes. Particularly in the food industry or other applications in which intensely heated goods are transported, damages in the corresponding pipe systems can otherwise result due to the thermal changes in the pipe length. It is advantageous if such pipe connectors can be installed and removed in the simplest manner possible, because maintenance can be made easier in this way.

At the same time, in some areas, such as for example in food processing, it is necessary for a pipe connector to be easy to clean. The transition between pipe and pipe connector should preferably run in a flat manner on the pipe interior in the axial direction, meaning, for example, without edges or an offset. In this way, it is possible to avoid having areas that are difficult to flush in the transition area, such as for example, corners and edges or recesses or offsets.

This arrangement of the pipe connector with regard to the two pipes that are to be connected, in which each transition between pipe and pipeline connector runs smoothly on the pipe interior in the axial direction without an offset between the components, is also called centered. A pipe connector in such a centered arrangement can likewise be described as centered. Often centering by means of the mounting of, for example, flange connectors, is not sufficient for centering due to the play in the radial direction. An offset can therefore result due to the screws and bores in the flanges. If the pipe connector is not centered, adequate cleaning by means of flushing cannot be guaranteed. It is therefore necessary, particularly in the food industry, to provide a pipe connector that can be installed in a centered manner.

SUMMARY

According to some aspects, this problem is solved by a pipe connector according to Claim 1 and/or other aspects of the present disclosure.

In some aspects, a pipe connector according to the present disclosure includes a compensator for the compensation of thermal change, particularly thermal expansion, as well as means for centering the pipe connector.

This centering can take place in such a manner that each of the inner edges of the pipe are brought into conformity with the inner edge of the pipe connector at each connection point, so that a flat connection exists between each two connected parts.

In a pipe connector according to the present disclosure, the means for centering includes a centering sleeve (that is also referred to in the following as a sleeve). Such a sleeve can exert uniform pressure and can therefore be advantageous, for example, in comparison to a screwed joint using flange connections alone. In the mounted state, this centering sleeve can extend along the entire length of the compensator. This can be advantageous, because a centering sleeve that, in the mounted state, extends along the entire length of the compensator can in this way prevent overexpansion of the compensator in the radial direction.

In this context, extending along the entire length of the compensator means that the length of the sleeve in the mounted state in the axial direction is longer than the length of the compensator in the axial direction, and when observed perpendicular to the axis of the pipe connector the length of the sleeve extends along the entire length of the compensator. In particular, then, for example, when observed perpendicular to the pipe and pipe connector axes from outside, only the centering sleeve and not the compensator are seen, except at points at which the sleeve is interrupted, e.g., by means of one or more holes. Such a centering sleeve can be formed as one piece. It can, however, also be formed as two pieces. Such a two-piece sleeve can be advantageous, because it can be assembled more easily than a one-piece sleeve. For example, during the assembly, the two parts can be joined together with a clamp and mounted in this way. In particular, such a two-piece sleeve can include two equally sized parts that during the assembly are joined together in the middle, for example by means of a clamp.

In an area where, in the mounted state, it surrounds the center area of the compensator, the sleeve can be formed such that it is continuous, meaning for example, without through holes. Such a centering sleeve can, however, also be interrupted at some points. In particular, such a centering sleeve can be formed such that it is not continuous in the middle. Such a centering sleeve can, for example, be formed such that it is continuous only after having been assembled and joined together, for example, with a clamp.

Such pipe connectors with compensators can, for example, be formed for connecting pipes with a nominal width that has a value that lies between DN 25 and DN 150.

The inside diameter of the sleeve can be formed in such a manner that it is only slightly larger than the diameter of the pipe ends and compensator ends, meaning, for example, of the flanges. In particular, the inside diameter of the sleeve can be greater than the diameter of the pipe ends and compensator ends, for example, by not more than 6 mm, particularly by not more than 5 mm or 4 mm or 3 mm or 2 mm, particularly by not more than 1 mm, particularly by not more than 0.1 mm.

This centering sleeve or its parts can be slid over the compensator and at least a part of the pipes after the compensator has been slid on or preliminarily inserted. As a result, the pipe connector is centered. Subsequently, for example, each of the pipe ends can be mounted detachably to an end of the pipe connector in the centered position. This can take place by means of screwing together the flange connections, for example.

In an embodiment of the present disclosure, the means for centering can additionally include two guide belts. These can run, for example, in the area where the pipe and pipe connector each meet over a part of the pipe and a part of the pipe connector. If the sleeve is now pulled over the pipe connector and the two areas of the pipes or flanges, each bordering thereon, the inner face of the sleeve presses uniformly onto the respective guide belts and leads to the pipe connector being centered. For example, each guide belt can run partially over a flange connected to a pipe (flange of a pipe) and partially over a flange connected to the compensator (flange of the compensator) if the connection between the compensator and pipe is brought about with flanges.

The two guide belts are preferably made of a non-elastic material, such as, for example, metal or (hard) plastic, for example, PTFE. In particular, they can be formed in such a manner that in the mounted state they protrude outwards radially slightly beyond the connection between a pipe and the pipe connector, meaning, for example, the respective flanges. As a result, the centering can take place solely by means of the pressure acting on the guide belts.

In some embodiments, such guide belts can, for example, be formed in such a manner that each projects more than 0.1 mm or more than 2 mm or more than 3 mm beyond the diameter of the respective flanges when they are affixed in the centered position.

Such guide belts can particularly be formed as broad guide belts, which means that their width (along the axial direction) is greater than the height (measured along the radial direction). For example, the width can amount to more than one times or more than two times or more than four times the height. The height and width can be measured in the state in which the pipe connector is mounted in order to connect pipes (mounted state).

In such a pipe connector according to the disclosure, the centering sleeve can be mounted by means of two or four mounting aids. Such mounting aids can be formed, e.g., as snap rings that optionally can have a round cross-section. For this purpose, two holes for the insertion of the mounting aid(s) can be provided in the sleeve. During this insertion, one mounting aid can be put through the sleeve via a hole from the outside and then guided along the sleeve on the side facing towards the compensator and the pipes. This guiding along the sleeve can thereby take place particularly perpendicular to the axis of the two pipes and the sleeve axis. In particular, the guiding can take place along the sleeve through a slot in the sleeve. In the area of this slot, the sleeve is thinner than in the other areas. In this way, the direction in which the mounting aid is inserted through a hole can be stipulated. In particular, this can be achieved by having sufficient room for the insertion of the mounting aids under the sleeve only in the area of these slots.

These two holes and optionally the slots can, for example, be provided in areas that come to lie over the pipe ends and/or the compensator ends in the mounted state. Such pipe ends and compensator ends can, for example, each include a flange.

A mounting aid, which preferably has a round cross-section, can then be inserted through these two holes. It is then possible to fix the direction in which the mounting aid is inserted by means of slots in the sleeve and/or in the pipe ends and/or compensator ends, such as, for example, the flanges. The mounting aid or the mounting aids can run, in the mounted state, along the inner radius of the centering sleeve, and namely, for example, at least in an angular range of 180° or at least in an angular range of 270° or at least in an angular range of 315° or at least in an angular range of 345° along the radius.

In addition, it is possible for a device to include two additional mounting aids or to be formed for the installation of two additional mounting aids. For example, further recesses can be provided for these. Such recesses can particularly be provided in such a manner that they do not lie under the sleeve, or lie only partially under the sleeve. The two additional mounting aids can run in an angular range of at least 180°, particularly of at least 270°, particularly of at least 315°, particularly of 345° along the radius of the pipe end or compensator end, for example, of a flange.

The freedom of movement of the mounting aids inserted through holes in the sleeve and/or of the optional additional mounting aids can be confined in the axial direction, e.g., by means of the provision of corresponding recesses or steps in the respective flanges and/or slots in the sleeve, which confine the freedom of movement. The freedom of movement of the compensator in the axial direction can likewise be confined. For example, due to the freedom of movement of the mounting aid, the distance by which the compensator can move can be fixed simultaneously. As a result, it is possible to prevent, for example, an excessively wide expansion of the compensator and an excessively strong compression of the compensator, both of which can lead to damage to the compensator. Alternatively, a first mounting aid can confine the expansion and a second mounting aid can confine the compression. In particular, the first mounting aid, inserted through a hole in the sleeve, can confine the possible expansion of the compensator in the axial direction while the optionally present, additional mounting aid confines the possible compression of the compensator, or vice versa.

The pipe connector according to the disclosure can be formed in such a manner that it or parts of it can be installed and removed and/or exchanged from the side without axial movement of the pipes that are connected. For example, it can be necessary to change the compensator or optionally present seals more frequently than the centering sleeve.

Optionally, it is possible (for example before or during a first installation of a pipe connector) for flanges to be welded into the pipe system, particularly on the two pipes that are to be connected. Such flanges can, for example, be welded in by means of a welding device with exact bore placement and spacing.

During the installation of a pipe connector, first the centering sleeve can be slipped over one of the two pipes that are to be connected together. In the case of a sleeve formed in two pieces, it is possible, for example, also to slip a sleeve part over each of the pipes to be connected. Then the pipe connector can be inserted, e.g., slid, loosely between the two pipes, guide belts can be affixed optionally and the centering sleeve can be slipped over the compensator and the pipe ends and/or connection means, particularly, for example, flanges of the pipes that are to be connected and the optionally present guide belts. In the case of sleeves formed as one piece or two pieces, optionally one or two earthing devices, such as, for example, springs, can be affixed before the sleeves or sleeve parts are slipped on over the compensator, so that the sleeve or each sleeve part individually is earthed. The part or parts of the earthing device can be formed in such a manner that they exert pressure on the sleeve in order to make it possible to maintain stable contact.

In the case of two-piece sleeves, the two sleeve parts can then also be slipped over the compensator, pipe ends and/or connection means, particularly, for example, flanges, of the pipes to be connected and the optionally present guide belts in such a manner that they meet together at a connection point. Then the two sleeve parts, for example, sleeve halves, can be mounted to one another and/or connected to one another. Such a mounting can be brought about by, for example, a clamp. By means of an optional insertion of one or two mounting aids through holes present in the centering sleeve, the centering sleeve can then be mounted and the movement of the sleeve in the axial direction can be confined. For example, it is possible, due to the two inserted mounting aids, to confine the movement of the sleeve in the axial direction to such an extent that as a result, the possible compression and/or possible expansion of the compensator is simultaneously confined. The pipe connector centered in this manner can then be mounted detachably in the centered position, for example, by screwing together flange connections in the centered position.

Two additional mounting aids can then optionally be affixed. Such additional mounting aids, in addition to the two already optionally present mounting aids, can be advantageous if only one compensator movement in one direction is confined by means of the already optionally present mounting aids. For example, it is possible that only the expansion or compression of the compensator is confined by the already present mounting aids. Then, due to the additional mounting aids, it would be possible to confine the compression or expansion, as the case may be. As a result, it is then possible to secure the compensator against excessive expansion and excessive compression.

To remove the respective pipe connector, the steps can, for example, be carried out in the reverse order. Alternatively, it is also possible after the removal of the one or two mounting aids first to release the sleeve and then the flange connection, and then to remove the compensator in this way. In a last step, it is then possible also to remove the sleeve as it is to be replaced.

Each of the previously described steps can be carried out from the side of the pipes, without an axial movement of the pipes away from each other or with respect to each other being necessary. This can simplify the installation and removal of the pipe connector, as well as its maintenance.

A pipe connector according to the disclosure can include a flange on each of the two compensator ends with which the pipe connector can abut on the pipes. One or both of the pipes to be connected can likewise include flanges on the pipe ends, whereby these flanges then can each be, for example, screwed to a flange on the compensator end.

One or both of the two flanges of the compensator can optionally be stepped on one side. This can be advantageous, for example, because an elevated edge that results from the step can serve, for example, to prevent the movement of a guide belt in one direction. Such an edge can also act to confine the movement of a mounting aid. Alternatively or additionally, one or both of the flanges of the pipe connector can include a recess, for example, for holding the mounting aid(s). Due to the edges on the sides of the recesses and/or of one or more steps, it is possible, for example, to confine in each case the freedom of movement of mounting aid(s) and/or of guide belts.

A pipe connector according to the disclosure can, for example, connect two pipes, each of which has flanges with equal diameters. (Indicated as diameter in this text is always the maximum diameter of the flange that, for example, can be measured in the mounted state perpendicular to the axis of the pipe connector.) Optionally, a pipe connector according to the disclosure can also include these two flanges of the respective pipes to which it can be connected. Such a pipe connector can, for example, be delivered directly with appropriate flanges that then could be welded on to the pipe ends of the pipes to be connected. The welding can take place, for example, by means of welding devices with exact bore placement and spacing.

In some embodiments, the flanges on the compensator have the same diameter as the flanges of the pipes to which it can be connected.

One or both of the flanges of the two pipes to be connected can include a recess, for example, for holding the mounting aid(s) and/or can be stepped on one side. Due to the edges on the sides of the recesses or on the side of the steps, the movements of, e.g., mounting aids and/or guide belts can be confined.

The two edges of flanges preferably lie in the area where the flanges meet together in the centered state, at the same height.

For example, one step of the flange in one pipe that is to be connected can be exactly as deep as the step of one flange or of the flanges on the compensator end(s). If this is the case for flanges with equal diameters, the two edges lying on the outer edge of the flanges can, when they are centered, lie at the same height.

In the case of flanges with different diameters, it can alternatively be advantageous if, in the case of two flanges that are to be mounted to each other, the one has a step and the other has a step with a different depth, so that the heights measured outwards from the centre point of the cross-section in the radial direction are equal. In this way, it can likewise be brought about that the edges lying on the outer edge of the flanges lie on two converging flanges at the same height when they are centered.

In some embodiments, the pipe connector includes seals, each of which can seal between a pipe and the device after the mounting of the device. These seals can optionally be replaced individually. This can be advantageous because in this way, each case of wear on a seal does not necessarily necessitate a complete replacement of the entire pipe connector or compensator. Such seals can preferably be made of an elastomer, such as, for example, EPDM, HNBR, FKM or the like. Such seals are very economical to replace. For example, seals made of PEEK- or PTFE-based materials can be used. It is possible to reduce costs and effort due to individually exchangeable seals. Such seals can preferably be formed in such a manner that, in the mounted state, they are held in their position due to their shape, for example, by a bulge in a flange or the like. In particular, they can be formed in such a manner that they are arranged in such a manner that they, on the inner edge of the pipe, likewise run smoothly in the axial direction, meaning without an offset and edges, with the edges of the pipe connector and pipe.

In some embodiments, a compensator can include expansion bellows. For example, a compensator can include expansion bellows in which the sinks have a cylindrical cross-section and/or in which the ratio of the radial depth to an axial width of the bellows amounts to roughly 1 or greater, as a result of which the expansion bellows can be easier to flush out.

Such expansion bellows can particularly be manufactured from a durable and/or easy to flush material, such as, for example, metal. In this way, it is possible, for example, to prevent the expansion bellows themselves from being very vulnerable to caustic cleaning agents or to the goods conducted by the pipes.

The disclosure furthermore includes a valve manifold and/or a pipe system that includes one, two, three, or more of the previously described pipe connectors.

Furthermore, the disclosure includes a method for the installation of one of the previously described pipe connectors with the steps that were described previously in association with the installation of such a pipe connector.

Further embodiments of the disclosure are described in the following with reference to the drawings. Shown are.

BRIEF DESCRIPTION OF THE DRAWINGS

DETAILED DESCRIPTION

Figure 1A:
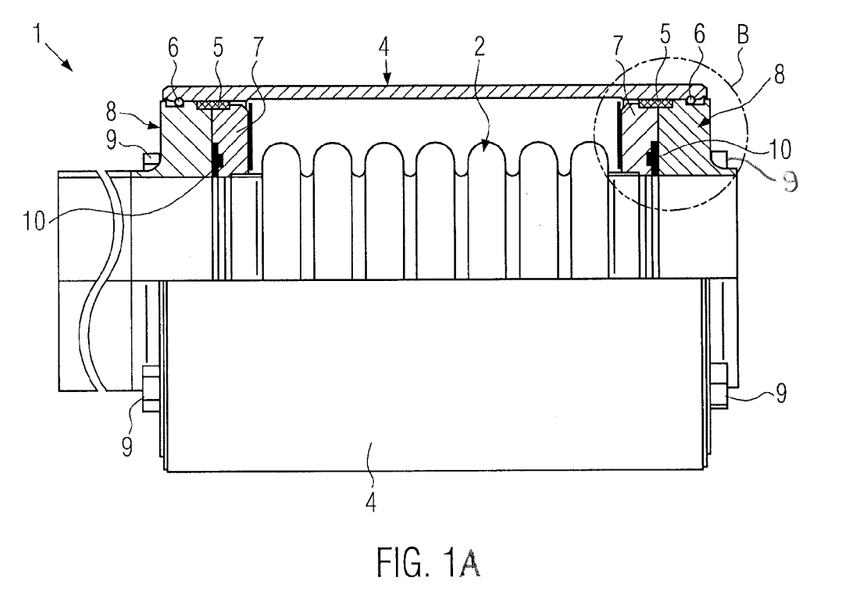
FIG. 1A illustrates a pipe connector according to a first arrangement.

FIG. 1A shows a pipe connector 1 that includes a compensator 2, a mounting aid 6 and means for centering the compensator 2. In the example shown in FIG. 1A, the means for centering includes a centering sleeve 4 as well as guide belts 5.

In the lower half of the view shown in FIG. 1A, a (mounted) centering sleeve 4 can be seen from the exterior; in the upper half a cross-section through the axis of the pipe connector 1 is visible.

Figure 1B:
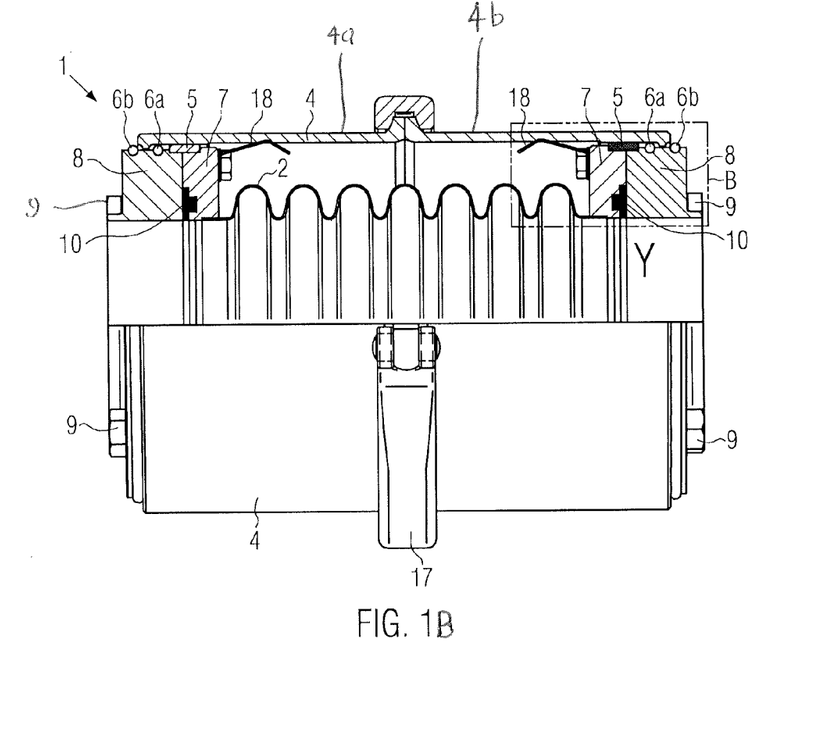
FIG. 1B illustrates a pipe connector according to a second arrangement.

Furthermore, a pipe connector 1 can include flanges 7 on the two ends of the compensator 2. A pipe connector 1 can also be connected to two pipes by means of the flanges 8 and can optionally include the flanges 8. For example, by screwing together flange connections using screws 9, the pipe connector can be mounted detachably to the pipes. As shown in FIGS. 1A and 1B, the compensator 2 can also include seals 10, that, in the mounted state, act as seals and that can prevent an emergence of fluid or transport goods from the pipe. In particular, a seal can be formed in such a manner that it can be exchanged individually.

Different embodiments for the area where the centering sleeve 4 lies on the two connected ends of the compensator 2 and pipe, which is indicated in FIGS. 1A and 1B as B, are shown in FIGS. 2A to 2E. The embodiments shown in FIGS. 2A to 2E are thereby depicted as alternatives, but they can also be combined. For example, it is possible to arrange one embodiment on one side of a pipe connector 2 and another embodiment of area B on the other side of the pipe connector 2.

A pipe connector 2, such as, for example, shown in FIG. 1A, can, for example, be installed as follows: The centering sleeve 4 can be pulled over a pipe that is to be connected. Because it can, in particular, be slid along the pipe, then the pipe connector 1 can be inserted between the two pipes. Optionally the guide belts 5 can be affixed at their position. This can take place, for example, by affixing them from the side. Then the centering sleeve 4 can be pulled over the compensator 2, and the pipe ends that can be formed, for example, as flanges 8. Due to the pressure of the centering sleeve 4 on the guide belts 5, the compensator 2 and/or the pipe connector 1 can be centered in this way. Then the two mounting aids 6 in this example can be inserted through two holes present in the sleeve 4, so that they come to lie in the slots 11 in the sleeve 4. The pipe connector 1 can also be mounted detachably to the two pipe ends in the centered position. In particular, this can take place by screwing the flanges, whereby in particular, in each case one flange 8 on one pipe end could be screwed to one flange 7 on the compensator 2. Alternatively, the detachable mounting of the pipe connector 1 can also take place before the insertion of the mounting aids 6.

In other examples, the step of the affixing of guide belts 5 and/or of the insertion of two mounting aids 6 through holes can be dispensed with or in addition to the two mounting aids 6a, another two mounting aids 6b can be affixed.

FIG. 1B shows another embodiment of a pipe connector 2. The components 2, 4, 5, 7, 8, 9, 10 shown in FIG. 1B correspond to the components shown in FIG. 1A. Differences with respect to FIG. 1A result, e.g., from the fact that the sleeve 4 in the example shown in FIG. 1B is divided into two pieces 4a and 4b. In the shown example, the two pieces 4a and 4b of the sleeve 4 are fixed in place by the clamp 17 in such a manner that, in the mounted position, it has the same functionality as the sleeve 4 shown in FIG. 1A. The device shown in FIG. 1B furthermore differs from the device from FIG. 1A in the area B, which is shown in detail in FIG. 2E. However, other embodiments of the area B can also be used in the device shown in FIG. 1B, for example, the embodiments shown in FIG. 2A to 2D.

In the case of a two-piece sleeve, normally the installation of the pipe connector 1 includes the additional step of joining together the sleeve parts 4a and 4b and the connection of the sleeve parts 4a and 4b, for example, by means of a clamp 17. Optionally, there can also be an affixing of one or more earthing (i.e., grounding) devices 18 during the installation of the pipe connector 1 with the one-piece or two-piece sleeve 4.

Figure 2A:
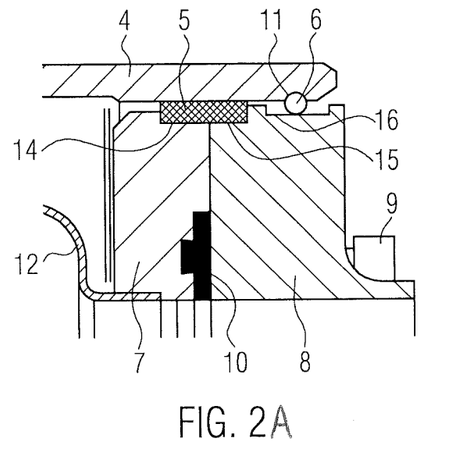
FIGS. 2A, 2B, 2C, 2D, and 2E illustrate different possible embodiments for a part of a pipe connector.

In FIG. 2A, one can see a part of the centering sleeve 4 shown in cross-section. This can have, as shown in this example, a slot 11 into which a mounting aid 6, e.g., with a circular cross-section, can be inserted. Preferably the mounting aid 6, such as, for example, a snap ring, can rotate in the slot 11, but preferably the mounting aid 6 in the embodiment shown in FIG. 2A cannot move in such a manner that its cross-section displaces axially with regard to the centering sleeve 4.

Likewise visible in FIG. 2A are a part of the expansion bellows 12, a flange 7 that is affixed to one side of the compensator 2, a flange 8 that is connected to a pipe, a screw 9 with which the two flanges 7 and 8 are screwed to each other, a guide belt 5, a step 14 in the flange 7 and a step 15 in flange 8. The two steps 14 and 15 are together of equal depth in this shown example and form together a recess that is so wide that the edges of the recess fix the guide belt 5 in a position. Alternatively, the two steps 14 and 15 can also have different depths or one step can be so deep that, in the centered position, it is flush with the edge of the second flange, for example, when the flanges 7 and 8 have different diameters (not shown here). In this case, the two steps 14, 15 or the one step and the one diameter can likewise be formed in such a manner that their edges come to lie on the coinciding area at the same height.

As shown in FIG. 2A, the guide belt 5 can be formed in such a manner that it projects somewhat beyond the outer radius of the flanges 7, 8, so that the power transmission from the centering sleeve 4 to the two flanges 7, 8 takes place only over the guide belt 5.

Likewise visible in the flange 8 is a recess 16 that is suitable for holding the mounting aid 6. The mounting aid 6 can move in the axial direction within this recess 16. Due to the dimensions of the recess 16, the maximum and minimum expansion of the compensator 2 are simultaneously fixed. In some embodiments of the invention, it is possible, for example, to fix a compensation distance of 6 mm. In some embodiments, it is possible, for example, for the mounting aid 6 to move in a slot 16 in each case by 3 mm or less than 3 mm or more than 3 mm or roughly 6 mm, more than 6 mm or less than 6 mm.

The seal 10, which is shown in cross-section, is preferably individually interchangeable. A compensator, which is, e.g., formed as expansion bellows 12 or that can include expansion bellows 12, is preferably manufactured from a durable material such as, for example, metal or the like. As a result, it can be easy to clean and is, for example, less markedly vulnerable to caustic cleaning agents. The part of the pipe connector 1 that is most susceptible to wear can consequently be the seal 10, which, however, is preferably individually exchangeable.

Figure 2B:
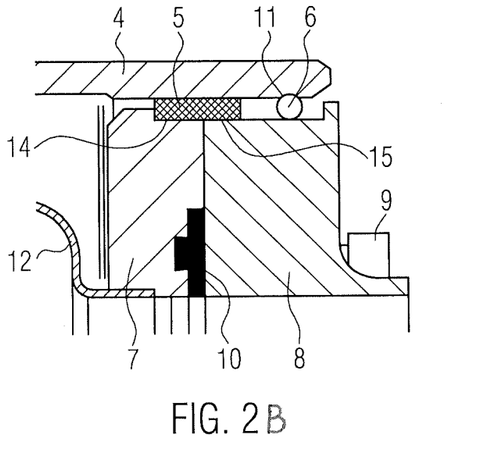

FIG. 2B shows an arrangement in which the flange 7 and flange 8 both have steps. In the centered position, the step 15 of the flange 8 is flush with the step 14 of the flange 7. The freedom of movement of the guide belt 5 can be confined in the axial direction on the one side by the edge of the step 14. On the other side, the freedom of movement of the guide belt is confined due to the fact that the mounting aid 6 is present. The guide belt 5 can therefore not move in the axial direction farther than up to the mounting aid 6. In such an embodiment, preferably the freedom of movement of the mounting aid 6 is confined by an edge of the step 15. In addition, the dimensions of the recess formed by the two steps 14, 15 are preferably such that at the same time, the guide belt 5 cannot slide completely on to the flange 8 and instead it always exerts a force for centering on both the flange 7 and the flange 8.

The further features of the area shown in FIG. 2B can correspond, for example, to the features shown in FIG. 2A.

Figure 2C:
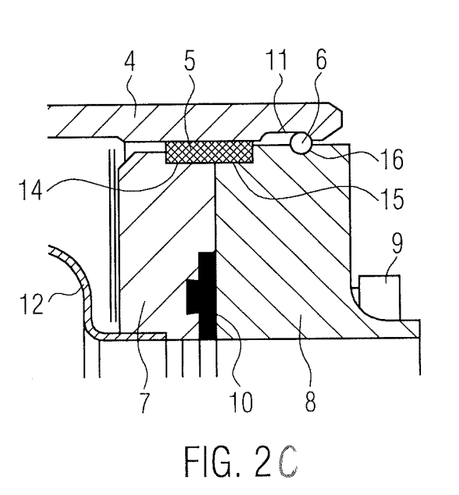

In FIG. 2C, in turn, a further arrangement is shown in which the flange 7 has a step 14 and the flange 8 has a step 15 and the guide belt 5 is held in its position against sliding in the axial direction by the edges of the two steps. Differing from the previously discussed examples, for example, in this case however a recess 16 is provided in the flange 8 in such a manner that it holds exactly the mounting aid 6, and although the mounting aid 6 can rotate in the recess, the cross-section of the mounting aid 6 is not movable in the axial direction with respect to the flange 8. A movement of the centering sleeve 4 is made possible in the example shown in FIG. 2C by the slot 11 in the centering sleeve 4, which allows set limits to a movement of the mounting aids 6 and consequently of the centering sleeve 4 in the axial direction. In the example shown in FIG. 2C, the axial plays of the sleeve 4 are fixed by the expansion of the slot 11 in the sleeve 4.

In other embodiments (not shown), it is also possible that slots in the centering sleeve 4 and/or in the flanges allows both a certain movement of the mounting aid 6 in the axial direction. In this case, the compensation distance can be fixed by the two freedoms of movement fixed by the slots.

Figure 2D:
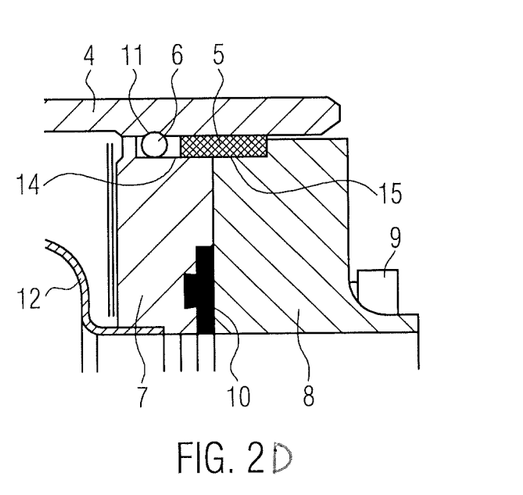

FIG. 2D, in turn, shows a further possible embodiment, in which the flange 8 has a step 15 and the flange 7 likewise has a step 14. When the pipe connector 2 is centered, the edges of the steps 14 of the flange 7 are flush with the edges of the step 15 of the flange 8. The centering is again brought about by means of a guide belt 5, the guide belt 5 is fixed in place on the one side by the edge that results from the step 15 and on the other side by the mounting aid 6. It is also possible, as in FIG. 2B, for the size of the centering sleeve 4 and the positions of the slots 11 to be selected in such a manner that the guide belt 5 always comes to lie on both flanges 7, 8 and simultaneously, the mounting aid 6 cannot slide off of the flange 7, for example, because of the edge of the step 14 of the flange 7.

Figure 2E:
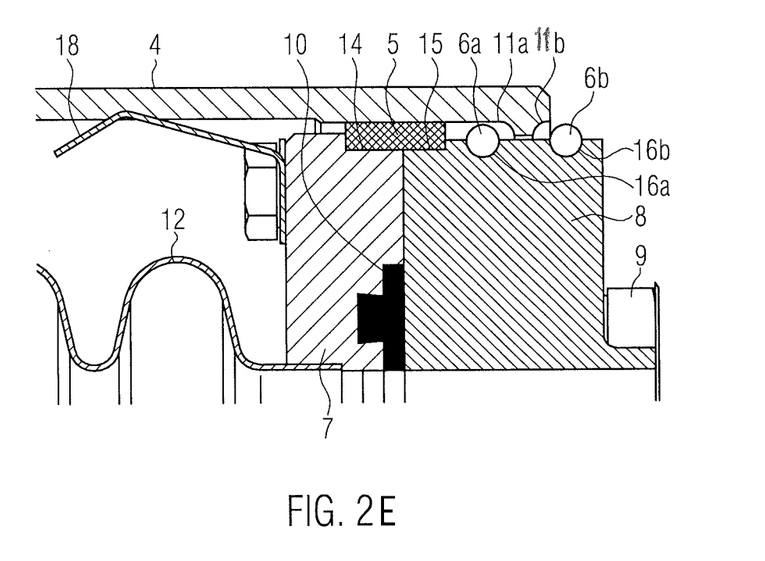

FIG. 2E shows a further embodiment. In this figure, in turn, it is possible to recognize a sleeve 4, a guide belt 5, flanges 7 and 8, screws 9 and a compensator, which can be formed, e.g., as expansion bellows 12 or which can include expansion bellows 12. The function here can correspond to the components with the same names shown in FIG. 2A to 2D.

The guide belt 5 in FIG. 2E likewise lies in a recess that is formed from the two steps 14 and 15 of the flanges 7 and 8. The movement of the guide belt 5 is consequently confined or is not possible in the axial direction.

In the embodiment shown in FIG. 2E, two mounting aids 6a and 6b are present in the area B. Altogether, it is therefore possible to mount a device that includes two of the parts shown in the example shown in FIG. 2E with four mounting aids 6a, 6b when it is formed symmetrically. The mounting aid 6a lies in a recess 16a in the flange 8. The recess 11a in the sleeve 4 allows a movement of the sleeve relative to the axis of the mounting aid 6a. Due to the slot 11a, however, only the maximum expansion that the compensator 2 can achieve is confined, and not the compression.

In the shown example, the mounting aid 6b is not under the sleeve 4 and also comes only partially under the sleeve 4 for the case of maximum compression. In the case of compression, the slot 11b in the sleeve 4 acts as a limit stop and consequently prevents further compression of the compensator. The mounting aid 6b lies in a recess 16b in the flange 8. In the shown example, the mounting aids 6a and 6b consequently together confine both the expansion and compression of the compensator, so that these are not possible to an extent beyond what the compensator can tolerate.

Furthermore, in FIG. 2E an additional earthing device 18 is visible that, for example, can be mounted detachably to the flange 7 by means of screws. This can be formed for the purpose of exerting pressure radially outwards on the sleeve 4 and can earth the two sleeve parts 4a, 4b as a result. This can be advantageous for applications of the pipe connector 1 in explosive areas, because the sleeve 4 otherwise can become electrostatically charged, for example, if the guide belts 5 are not conductive.

The earthing device 18 shown in FIG. 2E can be formed, for example, in the form of a (conductive) spring. Normally there is (at least) one earthing device 18 present per sleeve part 4, 4a, 4b. Such earthing devices can also be present on the embodiments that are shown in FIG. 2A to 2D.

Figure 3A:
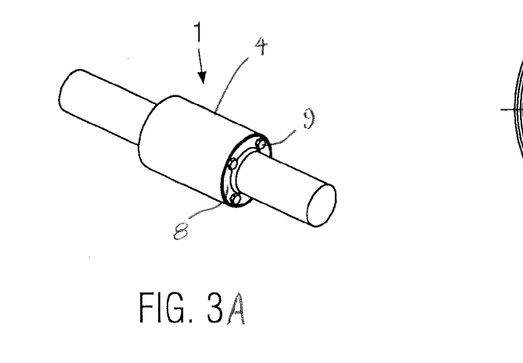
FIGS. 3A, 3B, 3C, and 3D illustrate views of mounted pipe connectors.
Figure 3B:
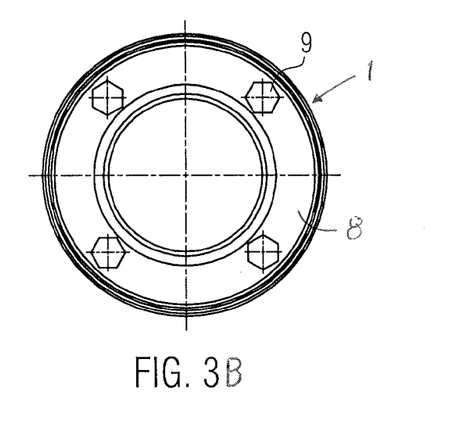

FIGS. 3A and 3B show exterior views of a pipe connector 1. In FIG. 3A, a screwed pipe connector 1 with a single-piece sleeve 4 is visible from the exterior. From the exterior, only one sleeve is thereby visible, as well as the screwed joints and the flange 8, as well as the pipes that are connected.

In FIG. 3B, a view onto the screwed joints in the direction of the pipes is visible. The flanges 8 can, for example, be screwed with four M8×25 screws 9.

Figure 3C:
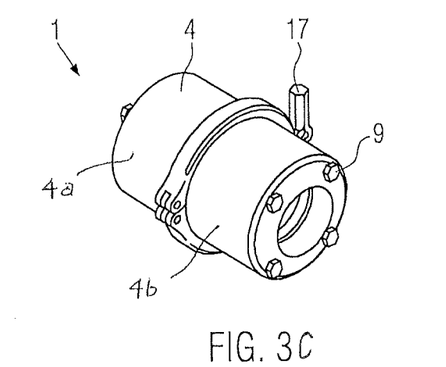
Figure 3D:
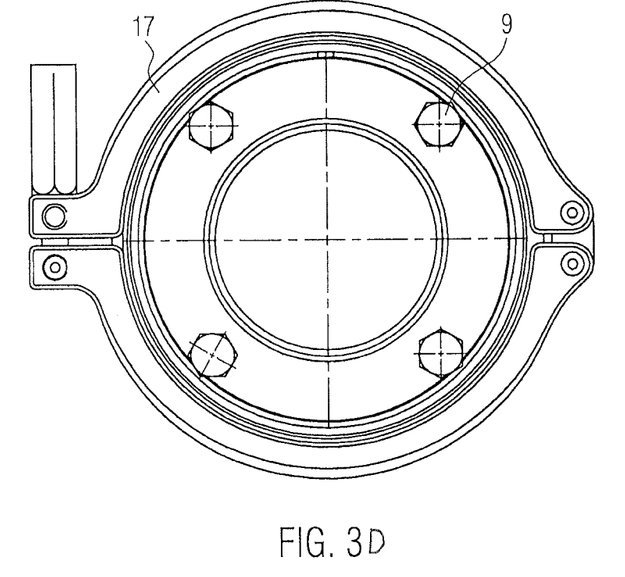

FIGS. 3C and 3D show exterior views of a pipe connector 1 in which the sleeve 4 is formed in two pieces 4a and 4b. Visible in, e.g., FIG. 3C is the sleeve 4, which is connected in the center by means of a clamp 17 or a similar auxiliary material. As in devices with sleeves formed as a single piece, in this example the connection is also made in a detachable manner, for example, by means of screws 9.

In FIG. 3D, a view onto the screwed joint in the direction of the pipes is visible. In addition, one sees thereby the clamp 17 as an example for a possibility for connecting the two sleeve parts 4a, 4b to each another.

Figure 4:
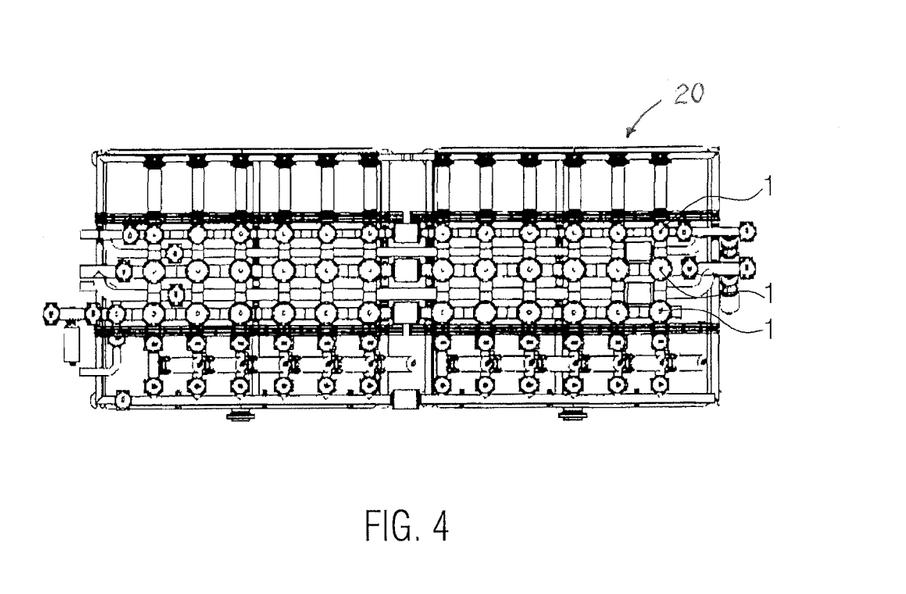
FIG. 4 illustrates a pipe system and/or valve manifold.

FIG. 4 shows an example of a pipe system and/or valve manifold 20 that includes one or more of the previously described pipe connectors 1. Such valve manifolds and/or pipe systems 20 can be used, for example, in food technology. In this case, thermal expansion compensators 2 are necessary, because it is possible that heated goods are being transported. In the case of an expansion of the pipes, also in the case of relative slight expansions, it is already possible for damage to result if a pipe system is operated without such pipe connectors 1 with compensators 2.

What is claimed is:

1. A combination of two pipe ends and a pipe connector, the pipe connector comprising a compensator and means for centering of the pipe connector, the means for centering the pipe connector comprising a centering sleeve that, in the mounted state, extends along the entire length of the compensator, wherein the pipe connector comprises a first flange on each of two sides of the compensator, wherein the pipe connector connects the two pipe ends, the pipe ends comprising second flanges, wherein at least one of the second flanges comprises a recess, and wherein the means for centering comprises two guide belts.

2. A combination according to claim 1, wherein the pipe connector can be mounted detachably after the centering.

3. A combination according to claim 1, wherein the centering sleeve can be mounted by means of one or more mounting aids.

4. A combination according to claim 3, wherein the freedom of movement of at least one of the mounting aids or the compensator is confined in the axial direction.

5. A combination according to claim 1, wherein the pipe connector can be exchanged from a side of the pipe ends without a movement of the pipe ends in the axial direction.

6. A combination according to claim 1, further comprising seals, each of which seals between a pipe end and the pipe connector after the mounting of the pipe connector.

7. A combination according to claim 1, wherein the compensator comprises expansion bellows.

8. A combination according to claim 1, wherein the sleeve is formed in two pieces.

9. A pipe system comprising at least one combination according to claim 1.

10. A combination according to claim 3, wherein the mounting aids comprise snap rings.

11. A combination according to claim 1, wherein at least one of the second flanges includes a step on one side.

* * * * *